United States Patent [19]
Kasper

[11] Patent Number: 5,026,339
[45] Date of Patent: Jun. 25, 1991

[54] SHEET PLASTIC CHECK VALVE TECHNIQUE

[75] Inventor: Thomas A. Kasper, Agour Hills, Calif.

[73] Assignee: Royce Medical Company, Westlake Village, Calif.

[21] Appl. No.: 483,902

[22] Filed: Feb. 22, 1990

[51] Int. Cl.⁵ .................. B31B 25/84; B31B 41/84
[52] U.S. Cl. ............................. 493/189; 493/213; 493/929
[58] Field of Search ............. 493/184, 193, 194, 195, 493/209, 213, 929, 962

[56] References Cited

U.S. PATENT DOCUMENTS

| | | | |
|---|---|---|---|
| 3,230,663 | 1/1966 | Shabram | 46/90 |
| 4,287,920 | 9/1981 | Johnson | 141/85 |
| 4,645,482 | 2/1987 | Yoshida | 493/189 |

FOREIGN PATENT DOCUMENTS

| | | | |
|---|---|---|---|
| 878245 | 8/1971 | Canada | 493/213 |
| 2425388 | 1/1980 | France | 493/213 |

*Primary Examiner*—William E. Terrell
*Attorney, Agent, or Firm*—Poms, Smith, Lande & Rose

[57] ABSTRACT

A fluid bladder including a check valve inturned within the bladder. The bladder is formed of two thin sheets of plastic material sealed together around the periphery of the bladder. The check valve is formed of an extended mating pair of strips of the same two sheets of plastic overlying one another and heat bonded together by a high frequency electric field along two substantially parallel lines to form a central flow channel with a closed gap-free configuration. In forming the check valve, at least one pair of electrodes are employed, and insulating material is used to enclose the electrodes so that the two sheets of plastic material are maintained parallel and in contact with one another during welding and the subsequent cool-down interval, thereby assuring reliable check valve operation.

16 Claims, 2 Drawing Sheets

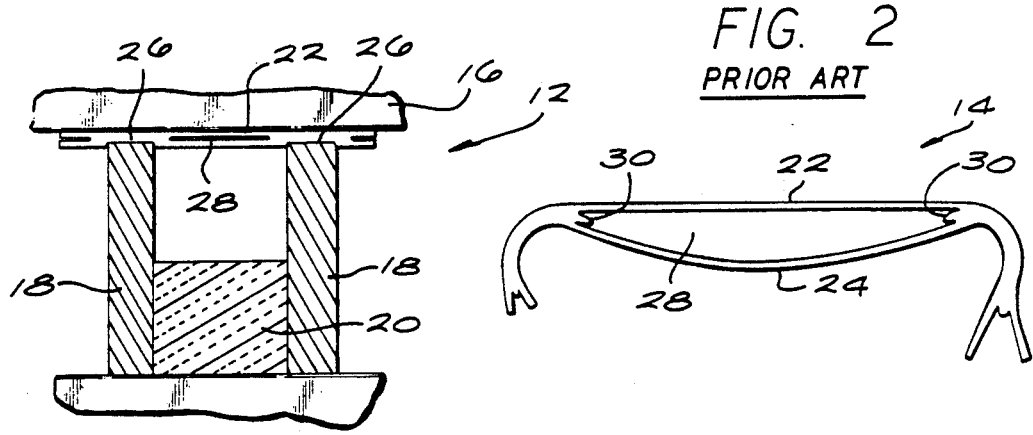
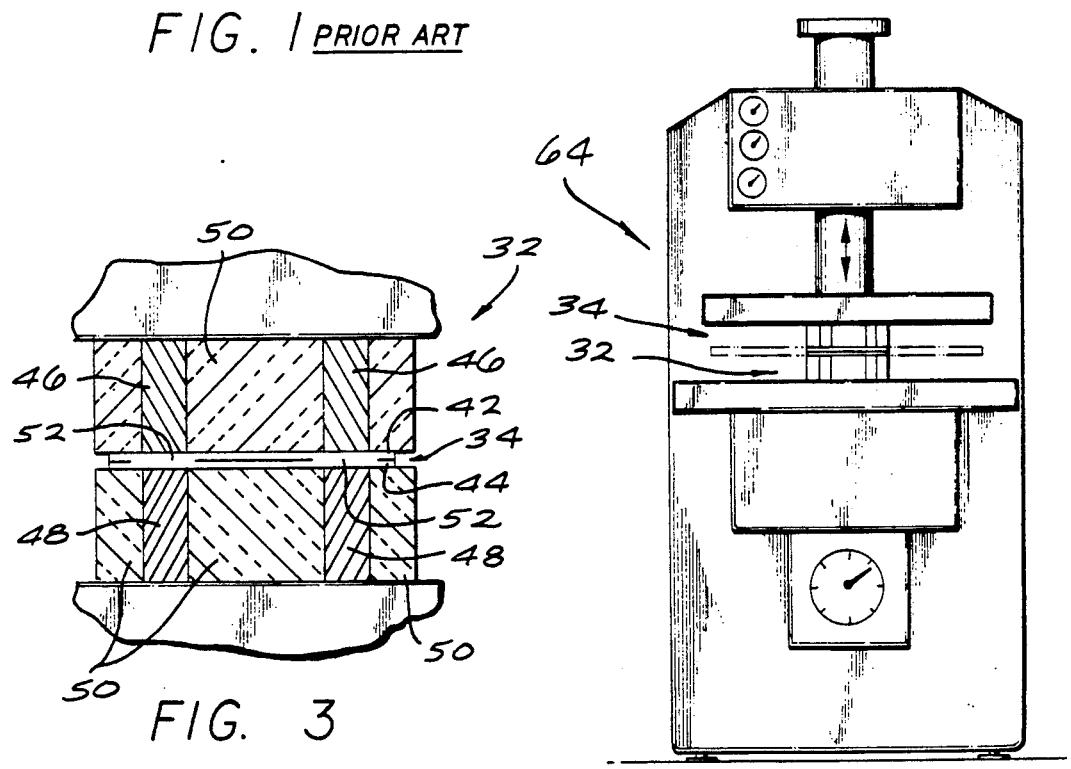

SHEET PLASTIC CHECK VALVE TECHNIQUE

BACKGROUND OF THE INVENTION

The present invention generally relates to a fluid bladder with a check valve and, more specifically, to a bladder wherein the check valve is formed of a mating pair of plastic sheets heat welded in substantially parallel lines to form a gap-free channel.

In the past, inflatable air bladders have been formed with integral valves. A common type of valve used for inflatable air bladders is a "duckbill" type valve. This type of valve may be formed of two parallel flaps joined along the edges to form a collapsed tube. The tube extends into the bladder, with a slightly open inlet or mouth for inflation.

In order to inflate the air bladder, air is forced into the bladder through the mouth of the valve. Thus, the air pressure is greater outside the air bladder than inside the air bladder. This pressure differential causes the flaps of the valve to separate and the valve to open.

After the air bladder is inflated, the air pressure inside the air bladder is greater than the air pressure outside the bladder. The greater air pressure inside the bladder forces the flaps of the valve together. Thus, the valve is sealed in a closed position, and the air inside the bladder cannot escape.

In order for this type of valve to function properly, the flaps must be in contact with each other and in a gap-free relationship in the absence of any pressure differential across the openings of the valve. Therefore, when the air bladder is deflated, and no pressure is being either forced into or out of the air bladder, the flaps must be in gap-free contact with each other. Any gap between the flaps of the valve will prevent the valve from sealing and will cause the valve to leak air when inflated.

The gaps in duckbill valves may be a result of the method by which the two flaps are joined together to form the duckbill valve. Typically, the two flaps are joined together along the edges by a conventional welding process. A conventional radio frequency (RF) welding die has brass electrodes mounted to and protruding from a supporting base of conducting or insulating material. As the sheet plastic is melted in the vicinity of the weld, the brass electrode sinks into the work. The flat surface of a platen or a buffer sheet maintains the opposite plastic sheet flat. The exerted pressure of the platen or buffer sheet causes the molten plastic to flow between the sheets of plastic and form beads at the boundary of the weld between the sheets. This distortion in the work at the weld becomes worse as thicker sheet plastic material is used because the electrodes sink further in, displacing more molten plastic. Further, lack of support of the plastic sheet material being welded causes the heated plastic to sag, leaving a gap in the valve channel.

A variation on a valve for use with an air bladder is disclosed in Shabram, U.S. Pat. No. 3,230,663. Shabram teaches an integral valve structure in which two plastic sheets are first heat-sealed together to form the bladder, then extensions of the plastic sheets folded inwardly into the bladder to form the valve. When the air bladder is inflated, the air pressure pushes against the inwardly-folded extensions, forcing them into closed contact with each other. Although this structure and method of fabrication is simple, the valve often fails to seal, thereby rendering the valve unreliable.

Attempts have been made to overcome the unreliability of this type of valve. For example, Johnson, U.S. Pat. No. 4,287,920, discloses a self-sealing duckbill valve. The valve is similar to the valve disclosed in Shabram, except that a tacky substance is applied between the flaps to enhance the adhesion of the flaps when there is a pressure differential across the openings. A reservoir of this tacky material is provided in the valve. However, similar to Shabram, if the tacky substance is not used, the valve also proves to leak and therefore unreliable.

Accordingly, a principal object of the present invention is to provide a simple and reliable sheet plastic check valve for air bladders or the like, which does not leak air and a method for making such valves.

SUMMARY OF THE INVENTION

In accordance with one aspect of the present invention, a check valve is formed of two thin sheets of plastic welded together to form a channel, with the welding electrodes being flush with an enclosing insulating material, so that the sheets of plastic are maintained parallel and in engagement with one-another throughout the welding process. Following formation of the check valve, the sheets of plastic may be folded back over themselves to form the mouth of the valve, and the sheets may be welded together to form a bladder, with the valve extending into the bladder configuration.

The resultant construction, illustrating the principles of the invention, is an air and fluid bladder, including a check valve, comprising a bladder formed of two thin sheets of plastic material sealed together around the periphery of the a bladder; and a check valve inturned within said a bladder, the check valve being formed of a mating pair of extended strips of the two sheets of plastic overlying one another and being heat bonded together by a high frequency electric field along two substantially parallel lines to form a central a flow channel, the check valve further having the two opposing faces of the strips forming the central flow channel engaging one another and being in a closed gap-free configuration.

The foregoing and other objects, features and advantages of this invention will be apparent from the following more particular description of the preferred embodiments of this invention, as illustrated in the accompanying drawings.

BRIEF DESCRIPTION OF THE DRAWINGS

FIG. 1 is a front view of a die used in prior art plastic sheet check valve fabrication;

FIG. 2 is a front view of a check valve of the prior art;

FIG. 3 is a front view of one embodiment of a die illustrating the principles of the present invention;

FIG. 4 is a front view of a check valve illustrating the present invention;

FIG. 5 is a front view of a radio frequency welder with one embodiment of a die used in the implementation of the present invention;

DESCRIPTION OF THE PREFERRED EMBODIMENT

Figure 7A:
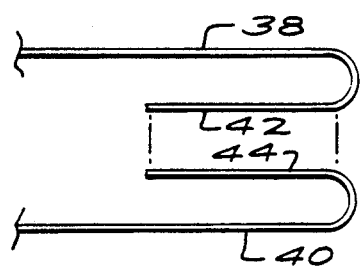
FIG. 7A is an enlarged side view of the check valve as formed inside the bladder.

Referring now to the accompanying drawings in which the same reference numerals designate identical features, FIG. 1 shows a conventional die 12 as used to fabricate a valve 14 of the prior art. The conventional die 12 comprises a conductive plate or a platen 16, two electrodes 18, and supporting base material 20. The electrodes 18 are spaced apart by the supporting base material 20.

The process of fabricating the prior art valve 14 first requires overlapping a first plastic sheet 22 and a second plastic sheet 24. The overlapped first and second plastic sheets, 22 and 24, are then inserted into the die 12 between the platen 16 and the two electrodes 18. The platen 16 comes into substantially flat contact with the first plastic sheet 22. The electrodes 18 contact the second plastic sheet 24 along two substantially parallel weld lines 26. However, the supporting base material 20 surrounding the electrodes 18 does not contact the second plastic sheet 24.

At the start of the welding cycle, the platen 16 is lowered vertically in order to contact the first plastic sheet 22, and to maintain the second plastic sheet 24 against the electrodes 18. The electrodes 18 will contact the second plastic sheet 24 along the two substantially parallel weld lines 26. High frequency welding power is then applied to the electrodes 18, thereby heat-bonding the first and second plastic sheets 22 and 24 together along the two substantially parallel lines 26.

During the welding cycle, the first plastic sheet 22 is in planar contact with the platen 16. However, as can be seen in FIG. 1, the two electrodes 18 protrude away from the base material 20. As a result, the second sheet of plastic 24 is not supported in a flat position, but instead is only supported by the two electrodes 18. Therefore, when the high frequency weld power is applied to the electrodes 18, the second plastic sheet 24 sags away from the first plastic sheet 22 between the substantially parallel weld lines 26. Molten plastic then flows between the first and second plastic sheets 22 and 24 and into the sagging area between the substantially parallel lines 26.

The resulting valve 14 from the described prior art fabrication process is shown in FIG. 2. The valve 14 has a hollow tube 28 extending between the substantially parallel lines 26 and along the length of the first and second plastic sheets 22 and 24. Two beads of plastic 30 are formed along each of the heat welded parallel lines 26. The beads of plastic 30 are the result of the molten plastic flowing between the first and the second plastic sheets 22 and 24 during the welding cycle. Upon cooling, the valve 14 has a set as indicated in FIG. 2 with the sagging lower sheet 24, and the beads 30 so that the first and second plastic sheets 22 and 24 do not normally come into flat contact with each other, and the valve is therefore unreliable.

Figure 8:
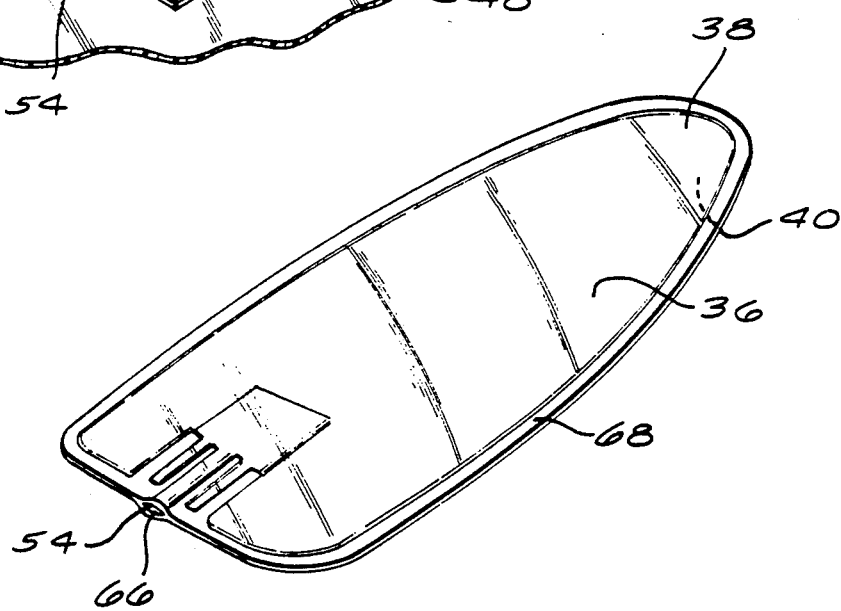
FIG. 8 is a perspective view of an air and fluid bladder with an integral check valve illustrating the invention.

Referring now to FIG. 3, a first embodiment of a novel die 32 for the implementation of the present invention is shown. The die 32 is used to fabricate an integral check valve 34 for an air bladder 36 (see FIG. 8).

The fluid bladder 36 (see FIGS. 7 and 8) is formed from a first plastic sheet 38 and a second plastic sheet 40. The first plastic sheet 38 is configured with a first extended plastic strip 42 at one end of the first plastic sheet 38; and the second sheet plastic 40 is likewise configured with a second extended plastic strip 44 at a corresponding end of the plastic sheet 40, see FIGS. 7 and 7A. The first second extended plastic strips 42 and 44 will form the valve 34 illustrative of the present invention.

Returning again more particularly to FIG. 3, the die 32 is comprised of a first pair of electrodes 46 and a second pair of electrodes 48. The electrodes in both the first and second pairs of electrodes 46 and 48 are spaced apart from each other by the insulating material 50, with the insulating material 50 extending beyond the electrodes 48 in both directions. The spacing of the insulating material 50 causes each of the electrodes in the first and second pair of electrodes 46 and 48 to be substantially parallel to the other electrode. A primary feature of the die 32 is that the outer surface of the insulating material 50 is flush with the outer surface of the pairs of electrodes 46 and 48. Therefore, the first pair of electrodes 46 and the second pair of electrodes 48 both form a flat outer surface with the insulating material 50.

To fabricate the valve 34, the first extended plastic strip 42 is layed over the second extended plastic strip 44. The overlapped first and second extended plastic strips 42 and 44 are then inserted into the die 32 between the first pair of electrodes 46 and the second pair of electrodes 48. The second pair of electrodes 48 and the surrounding insulating material 50 maintain the second extended plastic strip 44 in a substantially flat position. The first pair of electrodes 46 and the surrounding insulating material 50 are then lowered vertically in order to contact the first extended first plastic strip 42. The first pair of electrodes 46 and the surrounding insulating material 50 thus maintain the first extended plastic strip 42 in a flat position and in contact with the second extended plastic strip 44. High frequency welding power is then applied to the first and the second pair of electrodes 46 and 48, heat bonding the first and second extended plastic strips 42 and 44 together along two substantially parallel weld lines 52.

The first and second pair of electrodes 46 and 48 and the insulating material 50 maintain the first and second extended plastic strips 42 and 44 in a flat position and in contact with each other. Therefore, neither the first nor the second extended plastic strips 42 and 44 sags or separates from the other, and no beads are formed between the first and second extended plastic strips 42 and 44.

The check valve 34 formed from the first embodiment of the die 32 is shown in FIG. 4. The first and second extended plastic strips 42 and 44 are heat welded together in substantially parallel weld lines 52 along the length of the extended plastic strips 42 and 44. A flow channel 54 is thus formed between the substantially parallel weld lines 52. The channel 54 extends down the length of the first and second extended strips 42 and 44. The opposing faces of the channel 54 are parallel to each other and are normally in a closed, gap-free configuration.

Figure 6:
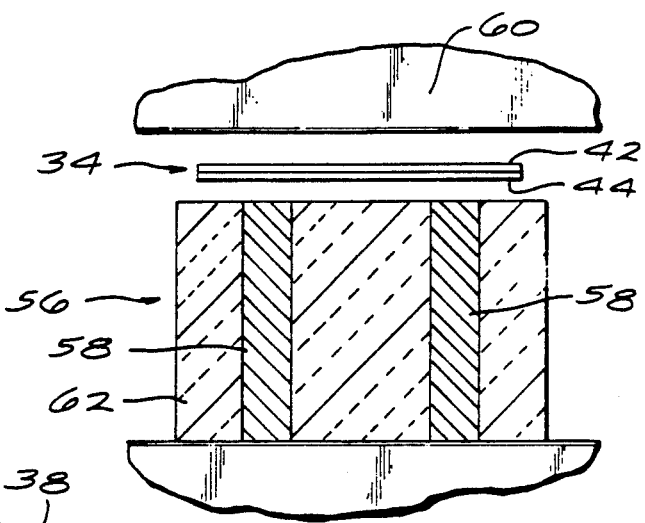
FIG. 6 is a front view of another embodiment of a die used in the implementation of present invention.

Referring now to FIG. 6, a second embodiment of a novel die 56 illustrating the invention is shown. Similar to the first embodiment of the die 32, the second embodiment of the die 56 is also used to fabricate the integral check valve 34 for the bladder 36.

The die 56 utilizes a pair of electrodes 58 and a conductive plate 60 to fabricate the valve 34. The pair of electrodes 58 are spaced apart and enclosed by insulating material 62. The insulating material 62 extends beyond the electrodes 58 in both directions. The spacing of the insulating material causes each of the electrodes in the pair of electrodes 58 to be substantially parallel to each other. The outer surface of the insulating material 62 is flush with the outer surface of the pair of electrodes 58. Therefore, the pair of electrodes 58 form a planar outer surface with the insulating material 62.

To fabricate the check valve 34, the first extended plastic strip 42 is layed over the second extended plastic strip 44. The overlapped extended plastic strips 42 and 44 are then inserted in the die 56 between the conductive plate 60 and the outer surface of the pair of electrodes 58 and the surrounding insulating material 62.

The conductive plate 60 is then lowered vertically in order to contact the first extended plastic strip 42. The first extended plastic strip 42 is in planar contact with the conductive plate 60. The pair of electrodes 58 and the surrounding insulating material 62 maintain the second extended plastic strip 44 in a substantially flat position and in contact with the first extended plastic strip 42.

High frequency welding power is then applied to the electrodes 58, thereby heat bonding the first and the second extended plastic strips 42 and 44 together along two substantially parallel weld lines 52 as shown in FIG. 4. The conductive plate 60 and the pair of electrodes 58 maintain the first and second extended plastic strips 42 and 44 in a flat position and in contact with each other. Therefore, neither of the extended plastic strips 42 or 44 sags or separates from the other. The valve 34 is thus fabricated with no gaps or beads formed between the first and second extended plastic strips 42 and 44.

In both the first embodiment of the die 32 and the second embodiment of the die 56, the insulating material 50 and 62 surrounding the pairs of electrodes 46, 48 and 56 is preferably a thermosetting polymer resin. The thermosetting resin serves as a convenient insulating material 50 and 62 because of the ease with which it can be poured around the electrodes 46, 48 and 58. As an alternative, ceramics, wood and other plastic materials may be used as the insulating material 50 and 62. The ceramic materials tend to be stiffer, thereby allowing a longer die life.

If plastic foams are used as the insulating material 50 and 62, the foam may be initially poured so as to protrude at a level above the top surface of the electrodes 46, 48 and 58 in a normal condition. The foam may then be compressed during a welding cycle with a rigid member between the electrodes to form a top surface flush with the electrodes 46, 48 and 58. Also suitable as the insulating material 50 and 62 are aluminum silicate, epoxy and polyester.

In an alternative embodiment of the die, the electrodes 46, 48 and 58 may be rounded or chamfered along their edges or corners with the contacting surfaces being later evened or made flat by filling in additional insulating material. The rounded or chamfered edges prevent excessive electric field strength which might otherwise occur along sharp edges of the electrodes 46, 48 and 58. As a result, the produced welds along the substantially parallel weld lines 52 are more even. The specific application for which the air bladder 36 and the check valve 34 are to be used will dictate which embodiment of the die 32 or 56 is to be used.

Referring now to FIG. 5, a typical radio frequency welder 64 is shown. The radio frequency welder 64 is suitable for use with both the first embodiment of the novel die 32 and the second embodiment of the novel die 56. The RF welder shown represents a Cosmos 15 kilowatt, 27.12 megaHertz machine. The RF welder 64 requires an AC line voltage for operation. When the welder 64 is in use, the AC line voltage is converted to high voltage DC by a transformer/rectifier. An oscillator powered by high voltage DC produces a radio frequency signal which is applied to the electrodes of 46, 48 and 58. A hydraulic actuator moves the first pair of electrodes 46 in the die 32, or the conductive plate 60 in the die 56, vertically in order to bring the first pair of electrodes 46 or the plate 60 into contact with the extended plastic strips 42. A control system for the welder 64 controls the duration of the welding cycle and the power delivered to the die.

When the RF electric field is applied to the electrodes 46, 48 and 58, the plastic strips 42 and 44 undergo internal heating and fuse together. The actuator in the welder 64 assures that there is sufficient pressure along the substantially parallel weld lines 52 so that a good weld is formed.

The welding cycle of the RF welder 64 consists of several stages. The first stage is the pre-clamp stage in which the first pair of electrodes 46 or the conductive plate 60 is fully seated against the plastic strips 42 and 44 to be welded. This stage lasts two to three seconds. The next stage is a seal stage. In the seal stage the electrodes 46, 48 and 58 are energized for a pre-set period of time which allows the plastic strips 42 and 44 to weld, but not long enough to cause excessive melting. The seal stage usually lasts one to five seconds. However, the amount of time may vary according to the amount of power used. The last stage is the post-seal stage. In this stage, the plastic material is allowed to cool and solidify or "set." This stage lasts between one and ten seconds, depending on the thickness of the plastic sheets 22 and 24 used. The plastic sheets 22 and 24 for this invention preferably range in thickness from 0.005 to 0.025 inches.

Figure 7:
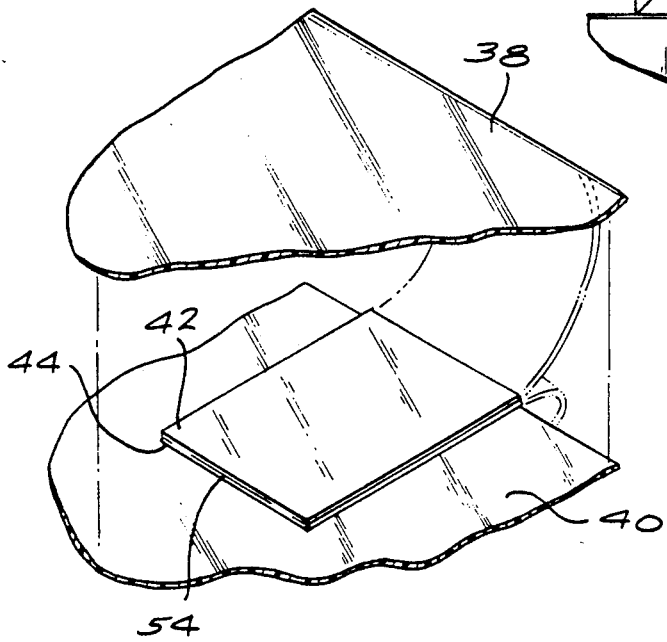
FIG. 7 is an exploded view of the check valve as formed inside the bladder.

As shown in FIGS. 7 and 7A, once the check valve 34 has been welded from the plastic strips 42 and 44, the plastic sheets 38 and 40 are inverted and folded back over themselves to enclose the valve 34. As the plastic sheet material is folded back over itself, the inlet mouth 66 of the valve 34 is formed. An outline 68 of the fluid bladder 36 is then welded. The outline of the bladder 36 may be welded by a conventional RF welding process. The excess plastic outside the welded outlines of the bladder 36 is then trimmed. Trimming of the excess plastic may be accomplished with the aid of a very thin border formed simultaneously with the outline weld.

After the outline 68 of the bladder 36 has been welded, the bladder 36 and valve 34 are ready for use. To inflate or fill the bladder 36, a small tube is inserted into the mouth 66 of the valve 34, into the channel 54, and fluid is pumped or blown into the bladder 36. The tube need only be partially inserted into the channel 54 for purpose of filling.

After the bladder 36 is inflated or filled, the pressure inside the bladder is greater than the air pressure outside the bladder 36. Therefore, the plastic strips 42 and 44, which are normally in a closed contacting position, are forced together by the pressure differential, rendering the valve 34 leak-proof.

The tube, if only partially inserted, does not need to be removed in order for the valve 34 to seal. The pressure differential created by the pressurized bladder 36 will still cause the valve 34 to seal in the portion of the channel 54 where the tube is not inserted.

To deflate or empty the bladder 36, a tube or thin rod may be inserted through the channel 54 and into the bladder 36. Fluid may then escape through the tube, or around the rod, allowing the bladder 36 to empty.

The valve and bladder are preferrably made of urethane, but other plastic sheet material may be used.

While the invention has been particularly shown and described in reference to the preferred embodiments thereof, it will be understood by those skilled in the art that changes in form and details may be made without departing from the scope of the invention. Thus, by way of example and not of limitation, the valve of the present invention is applicable to other fluids, including liquids, as well as air.

I claim:

1. A method of forming a fluid bladder including a valve, comprising the steps of:
   providing a first plastic sheet and a second plastic sheet, the first plastic sheet having a first extended strip on one end, and the second plastic sheet having a second strip on one end corresponding to the first extended strip;
   welding the first and second extended strips together by applying a high frequency electric field along two substantially parallel weld lines, the substantially parallel weld lines extending toward and ending adjacent the aligned edges of the first and second extended strips to form a central channel;
   accomplishing the welding using a plurality of electrodes with a pair of electrodes contacting at least one side of said strips and an adjacent support structure extending between the electrodes with the electrodes and the adjacent supporting structure forming a substantially continuous surface with no significant discontinuities and additional conductive means cooperating with said pair of electrodes and having a mating surface configuration substantially parallel to said continuous surface; said electrodes and conductive means serving to maintain the first and second extended strips parallel and in contact with each other in a closed gap-free configuration during welding and further wherein the electrodes contact the strips during the welding along the two substantially parallel weld lines, thereby forming a check valve with the central channel having adjacent surfaces of the first and second extended strips normally touching each other;
   inverting and folding the first and second plastic sheets back over the check valve to enclose the check valve;
   welding the first and second plastic sheets together to form an enclosed bladder enclosing the check valve; and
   trimming the first and second plastic sheets to remove excess plastic material outside the desired outline of the bladder, whereby the check valve forms an inlet to the bladder with a slightly enlarged mouth through which the bladder may be inflated or filled, and furthermore the untreated normally closed central channel of the valve forms the check valve for normally blocking or inhibiting deflation or leaking of the bladder.

2. A method of forming a fluid bladder including a check valve in accordance with claim 1 wherein the first and second extended strips are maintained parallel and in contact with each other by using a platen to maintain the first extended strip, and using the plurality of electrodes and adjacent insulating supporting structure to support and maintain the second extended strip parallel and in contact with the first extended strip.

3. A method of forming a fluid bladder including a check valve in accordance with claim 1 wherein a first pair of the plurality of electrodes and the adjacent supporting structure are used to support and maintain the first extended strip parallel and in contact with the second parallel strip, and furthermore, a second pair of the plurality of electrodes and the adjacent supporting structure are used to support and maintain the second extended strip parallel and in contact with the first extended strip.

4. A method of forming a fluid bladder including a check valve in accordance with claim 1 wherein the adjacent supporting structure is constructed of an insulating material.

5. A method of forming a fluid bladder including a check valve in accordance with claim 4 wherein the insulating material is a thermoseting resin material.

6. A method of forming a fluid bladder with a check valve in accordance with claim 4 wherein the insulating material is ceramic material.

7. A method of forming a fluid bladder with a check valve in accordance with claim 4 wherein the insulating material is a plastic foam material.

8. A method of forming a fluid bladder with a check valve in accordance with claim 7 wherein a surface of the plastic foam material is initially formed at a level above a top surface of the plurality of electrodes and is compressed during a welding cycle to be flush with the electrodes.

9. A method of forming a fluid bladder with a check valve in accordance with claim 1 wherein the plurality of electrodes are rounded chamfered at their edges which contact the first and second extended strips of plastic material.

10. A method of forming a fluid bladder including a valve, in accordance with claim 1 wherein said substantially continuous surface and said mating surface configuration are substantially planar.

11. A method of forming a fluid bladder including a valve, in accordance with claim 1 wherein the welding is accomplished using two pairs of electrodes, one pair of electrodes contacting each side of said strips.

12. A method of forming a fluid bladder including a valve, in accordance with claim 1 wherein said adjacent supporting structure further extends beyond the outer edges of the electrodes to form a substantially continuous surface with the electrodes.

13. A method of forming a fluid bladder including a valve, comprising the steps of:
   providing a first plastic sheet and a second plastic sheet, the first plastic sheet having a first extending area on one end, and the second plastic sheet having a second extending area on one end;
   forming the valve by overlying the first and the second extending areas of plastic sheet material;
   using a plurality of electrodes, with a pair of electrodes contacting at least one side of said sheets, and an adjacent supporting structure extending between the electrodes wherein the electrodes and the adjacent supporting structure form a substantially continuous surface with no significant discontinuities, and additional conductive means cooperating with said pair of electrodes and having a mating surface configuration substantially parallel to said continuous surface; said electrodes and conductive means serving to maintain the first and second extending areas parallel and in contact with each other;

welding the first and the second extending areas of plastic together by contacting the electrodes to the extending areas and applying a high frequency electric field along two substantially parallel weld lines extending toward and ending adjacent at least one edge of the first and second extending areas to form a central channel, the central channel being in a normally closed, gap-free configuration;

inverting and folding the first and second plastic sheets back over the check valve to enclose the check valve;

sealing the first and second plastic sheets together to form an enclosed bladder enclosing the check valve; and trimming the first and second plastic sheets to remove excess plastic material outside the desired outline of the bladder, whereby the check valve forms an inlet to the bladder with a slightly enlarged mouth through which the bladder may be inflated or filled, and furthermore the untreated normally closed, central channel of the valve forms the check valve for normally blocking or inhibiting deflation or leaking of the bladder.

14. A method of forming a fluid bladder including a valve, in accordance with claim 13 wherein said substantially continuous surface and said mating surface are substantially planar.

15. A method of forming a fluid bladder including a valve, in accordance with claim 13 wherein two pairs of electrodes are used with one pair of electrodes contacting each side of said strips.

16. A method of forming a fluid bladder including a valve, in accordance with claim 13 wherein said adjacent supporting structure further extends beyond the outer edges of the electrodes to form a substantially continuous surface with the electrodes.

* * * * *